US008938189B2

(12) United States Patent
Murata et al.

(10) Patent No.: US 8,938,189 B2
(45) Date of Patent: Jan. 20, 2015

(54) TONER CONVEYING DEVICE AND IMAGE FORMING APPARATUS INCLUDING THE SAME

(71) Applicant: KYOCERA Document Solutions Inc., Osaka (JP)

(72) Inventors: Koji Murata, Osaka (JP); Naoki Yamane, Osaka (JP); Tatsuhiko Yoshii, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 13/751,457

(22) Filed: Jan. 28, 2013

(65) Prior Publication Data

US 2013/0216288 A1  Aug. 22, 2013

(30) Foreign Application Priority Data

Feb. 20, 2012  (JP) ................................. 2012-034431
Apr. 16, 2012  (JP) ................................. 2012-092718

(51) Int. Cl.
*G03G 15/08* (2006.01)
*B65G 33/32* (2006.01)
*G03G 21/10* (2006.01)

(52) U.S. Cl.
CPC ............ *G03G 15/0891* (2013.01); *B65G 33/32* (2013.01); *G03G 21/105* (2013.01); *G03G 2215/0827* (2013.01)
USPC ............................ 399/256; 399/258; 198/673

(58) Field of Classification Search
USPC .................................... 399/256, 358; 198/673
See application file for complete search history.

(56) References Cited

U.S. PATENT DOCUMENTS 6,070,035 A * 5/2000 Fujita et al. ................... 399/258

FOREIGN PATENT DOCUMENTS

| JP | H09-218627 A | 8/1997 |
| JP | 2002-132109 A | 5/2002 |
| JP | 2005-091809 A | 4/2005 |
| JP | 2006-176269 A | 7/2006 |

OTHER PUBLICATIONS

English Abstract and Translation for JP 2002-132109 A, published May 9, 2002.
English Abstract and Translation for JP 2005-091809 A, published Apr. 7, 2005.
English language Abstract and Machine Translation for JP H09-218627 A, published Aug. 19, 1997.
English language Abstract and Machine Translation for JP 2006-176269 A, published Jul. 6, 2006.

* cited by examiner

*Primary Examiner* — Benjamin Schmitt
(74) *Attorney, Agent, or Firm* — NDQ&M Watchstone LLP

(57) ABSTRACT

A toner conveying device of the present disclosure includes a conveying screw, a toner conveying pipe, and a plurality of convex portions that are formed on an inner wall surface of the toner conveying pipe. The conveying screw has a rotary shaft and a conveying vane that is formed on an outer peripheral surface of the rotary shaft. The toner conveying pipe has a circular section, and the conveying screw is rotatably disposed inside the toner conveying pipe. Each of the convex portions is formed within an area defined by half the circumference along the inner wall surface of the toner conveying pipe and supports the conveying screw so that an axial center of the rotary shaft substantially coincides with a center axis of the toner conveying pipe.

5 Claims, 7 Drawing Sheets

TONER CONVEYING DEVICE AND IMAGE FORMING APPARATUS INCLUDING THE SAME

INCORPORATION BY REFERENCE

This application is based on and claims the benefit of priority from Japanese Patent Application No. 2012-34431 (filed on Feb. 20, 2012) and from Japanese Patent Application No. 2012-92718 (filed on Apr. 16, 2012).

BACKGROUND

The present disclosure relates to a toner conveying device used in an image forming apparatus such as a copy machine, a printer, a facsimile, a multifunctional peripheral having functions of these apparatuses, or the like.

A conventional image forming apparatus generally performs a process in which a powdered developer is mainly used to visualize, by use of a developing device, an electrostatic latent image formed on an image bearing member such as a photosensitive drum or the like, and a visualized image (toner image) thus formed is transferred onto a recording medium and then is subjected to fixing processing. Toner remaining on the surface of the image bearing member is removed by a cleaning device, after which a new toner image is formed thereon. The residual toner that has been removed by the cleaning device is stored in a waste toner bottle. When the waste toner bottle becomes filled to capacity after a predetermined number of times of printing, a user is notified as such, and the waster toner bottle is discarded to be replaced with a new one.

It has been known to use, as a waste toner collecting path from the cleaning device to the waste toner bottle, a toner conveying path constituted by a pipe-shaped conveying passage including inside thereof a conveying screw. In this toner conveying path, in a case where, due to dimensional tolerances on the outer diameter of the conveying screw and on the inner diameter of the conveying passage, warping of the conveying screw, or the like, a trajectory of an outer peripheral edge of the conveying screw when rotating becomes larger than the inner diameter of the conveying passage, an excessive rotational load might be generated by friction to stop the conveying screw from rotating. In order to avoid this, typically, dimensional setting is so performed that the outer diameter of the conveying screw is smaller than the inner diameter of the conveying passage.

Such dimensional setting, however, brings about a situation where, due to a clearance (gap) present between the conveying screw and the conveying passage, the conveying screw, if warped, rotates while swinging in a radial direction (while being decentered) and impacts against an inner surface of the conveying passage, resulting in occurrence of a hitting sound.

To be more specific, if the conveying screw is warped, when a warping direction is downward, the conveying screw sags under its own weight in the same direction as the warping direction and thus is deformed in an increased amount. On the other hand, when the warping direction is upward, the conveying screw sags under its own weight in a direction opposite to the warping direction and thus is deformed in a decreased amount. Because of this, when the conveying screw rotates from a state where it is warped upward, the conveying screw is gradually shifted in direction from a direction in which the conveying screw is in a balanced state where a deformation amount thereof is small to a direction in which sagging thereof under its own weight acts to increase the degree of the warping thereof. As a result, the conveying screw rotates while being deformed into a large wave shape and impacts against the inner surface of the conveying passage. The level of a hitting sound that occurs at this time increases with increasing degree of warping of the conveying screw, with increasing size of the clearance (gap) between the conveying screw and the inner surface of the conveying passage, and with increasing weight of the conveying screw.

As a solution to this, there has been known a toner conveying device that has a portion where the outer diameter of a spiral-shaped protrusion (spiral vane) of a conveying screw comes in extreme proximity to the inner diameter of a cylindrical conveying passage so that the conveying screw can rotate stably while being in contact at part of the outer diameter thereof with an inner side of the cylindrical conveying passage. Furthermore, there has also been known a toner conveying pipe that is composed of a pipe main body having a semi-tubular portion and a semi-tubular lid that is joined to the semi-tubular portion and in which a joint surface between the pipe main body and the semi-tubular lid is made substantially flat, and ultrasonic welding is performed with respect to a joint portion therebetween, so that excellent air tightness and dimensional accuracy are achieved.

In the above-described configuration, however, due to dimensional tolerances and assembly tolerances of components, there is a limitation in setting a clearance between the conveying screw and the cylindrical conveying passage, and if the conveying screw is warped beyond the size of the clearance, the conveying screw impacts against the inner surface of the conveying passage, making it impossible to reliably prevent a hitting sound from occurring. Furthermore, in the method in which there is provided a portion where the outer diameter of the conveying screw comes in extreme proximity to the inner diameter of the cylindrical conveying passage, part of the spiral vane of the conveying screw rubs against the inner surface of the conveying passage, so that the rotational load is increased. Moreover, the presence of toner in the clearance between the conveying screw and the conveying passage further increases the rotational load, so that the flowability of the toner is decreased due to frictional heat to deteriorate conveying efficiency, and the toner might even be solidified if left in that state for a long period of time.

The foregoing has described the problems with the case where a toner conveying path constituted by a pipe-shaped conveying passage including inside thereof a conveying screw is used as a waste toner collecting path from a cleaning device to a waste toner bottle. In addition, similar problems arise in a case where a toner cartridge for replenishing a developing device with toner is incorporated, and a toner conveying path constituted by a conveying pipe including inside thereof a conveying screw is used also as a toner replenishing path used to replenish the developing device with toner from the toner cartridge depending on a toner consumption in the developing device.

SUMMARY

A toner conveying device according to one aspect of the present disclosure includes a conveying screw, a toner conveying pipe, and a plurality of convex portions that are formed on an inner wall surface of the toner conveying pipe. The conveying screw has a rotary shaft and a conveying vane that is formed on an outer peripheral surface of the rotary shaft. The toner conveying pipe has a circular section, and the conveying screw is rotatably disposed inside the toner conveying pipe. Each of the convex portions is formed within an area defined by half the circumference along the inner wall surface of the toner conveying pipe and supports the conveying screw so that an axial center of the rotary shaft substantially coincides with a center axis of the toner conveying pipe.

DETAILED DESCRIPTION

Figure 1:
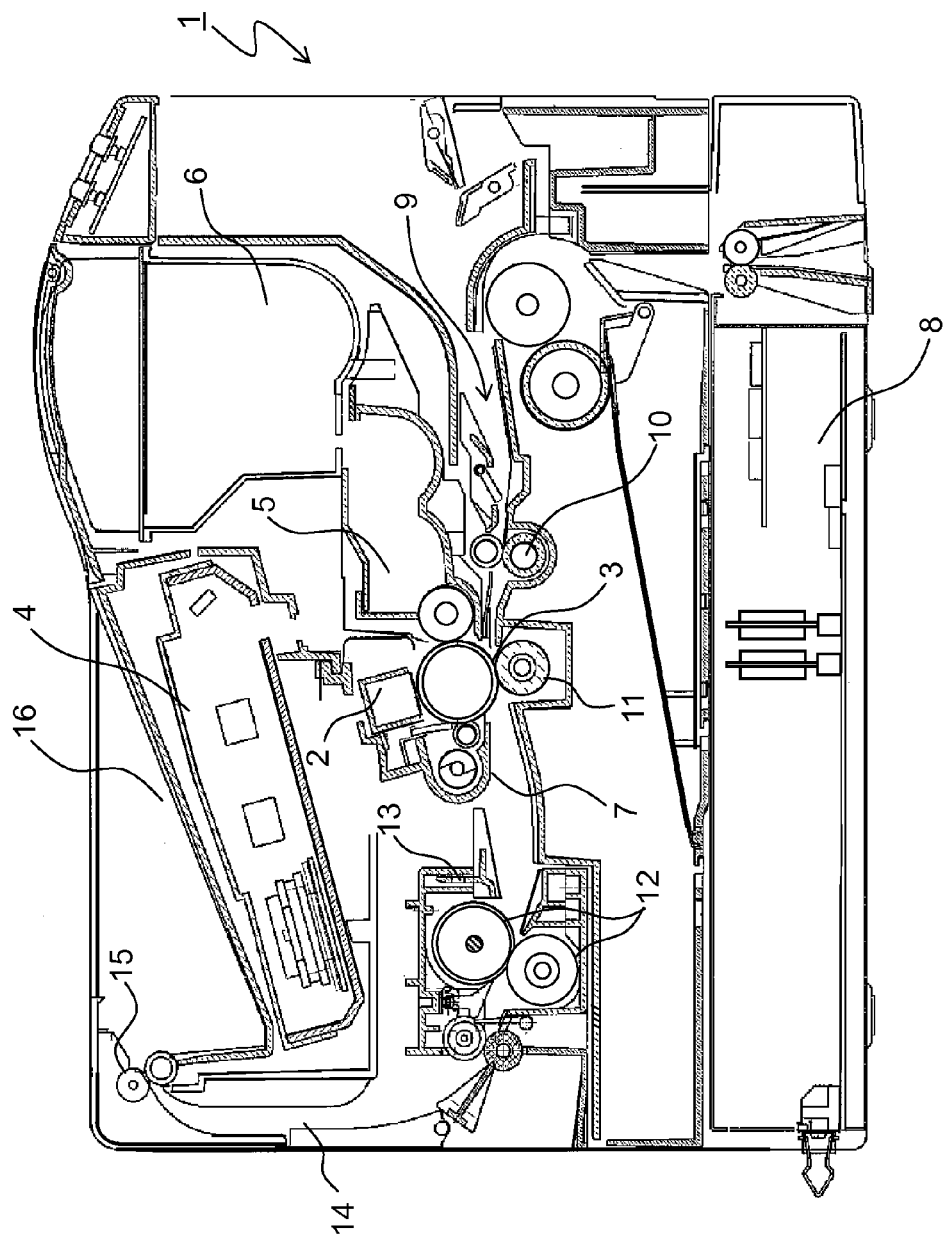
FIG. 1 is a schematic sectional view showing an entire configuration of an image forming apparatus 1 including a toner conveying device 30 of the present disclosure.

The following describes embodiments of the present disclosure with reference to the appended drawings. FIG. 1 is a schematic sectional view showing a configuration of an image forming apparatus 1 of the present disclosure. In the image forming apparatus (e.g. a printer) 1, in performing an image forming operation, a photosensitive drum 3 that is rotating in a clockwise direction in FIG. 1 is uniformly charged by a charging unit 2. By use of a laser beam from an exposure unit (a laser scanning unit, etc.) 4 based on image data, an electrostatic latent image is formed on the photosensitive drum 3. Then, by a developing unit 5, a developer (hereinafter, referred to as toner) is made to adhere to the electrostatic latent image to form a toner image.

Toner is supplied to the developing unit 5 from a toner container 6. As for image data, such data is transmitted from a personal computer (not shown) or the like. Furthermore, a static eliminator (not shown) that removes residual charge on the surface of the photosensitive drum 3 is provided on a downstream side of a cleaning device 7 with respect to a rotation direction of the photosensitive drum 3.

From a paper feed cassette 8, a sheet (a transfer sheet, an OHP sheet, etc.) is conveyed via a sheet conveying passage 9 toward the photosensitive drum 3 on which the toner image has been formed as described above. Through the use of a registration roller pair 10, timing for feeding the sheet to a transfer roller 11 (image transfer portion) is adjusted. Then, by the transfer roller 11, the toner image that has been formed on the surface of the photosensitive drum 3 is transferred onto the sheet. The sheet onto which the toner image has been transferred is separated from the photosensitive drum 3 and then is conveyed to a fixing portion 13 having a fixing roller pair 12, where the toner image is fixed. After having passed through the fixing portion 13, the sheet is conveyed to an upper portion of the apparatus via a sheet conveying passage 14 to be ejected onto a discharge tray 16 by an ejection roller pair 15.

Meanwhile, toner remaining on the surface of the photosensitive drum 3 is removed by the cleaning device 7. Then, the photosensitive drum 3 is subjected to static elimination by the static eliminator (not shown) and thereafter is charged again by the charging unit 2. From then on, image formation is performed in a similar manner.

The photosensitive drum 3 is formed by, for example, applying a photosensitive layer that is made of amorphous silicon (a-Si) or an organic photosensitive layer (OPC) onto an outer peripheral surface of an aluminum drum, and the surface thereof is charged by the charging unit 2. On the surface of the photosensitive drum 3 where a laser beam from the exposure unit 4 is received, an electrostatic latent image having attenuated charge is formed. The charging unit 2 charges the surface of the photosensitive drum 3 through discharge (e.g. corona discharge). The charging unit 2 uses, for example, a thin wire or the like as an electrode, and applying a high voltage to the electrode causes the charging unit 2 to perform discharge.

Based on image data, the exposure unit 4 irradiates the photosensitive drum 3 with a light beam (e.g. a laser beam) to form an electrostatic latent image on the surface of the photosensitive drum 3. The developing unit 5 includes a developing roller disposed so as to be opposed to the photosensitive drum 3. By use of the developing roller, the developing unit 5 makes a developer contained therein adhere to the electrostatic latent image on the photosensitive drum 3 to form a toner image.

After the toner image has been transferred onto a sheet, the cleaning device 7 removes toner (residual toner) remaining on the surface of the photosensitive drum 3. A detailed description of the cleaning device 7 is described later.

Figure 2:
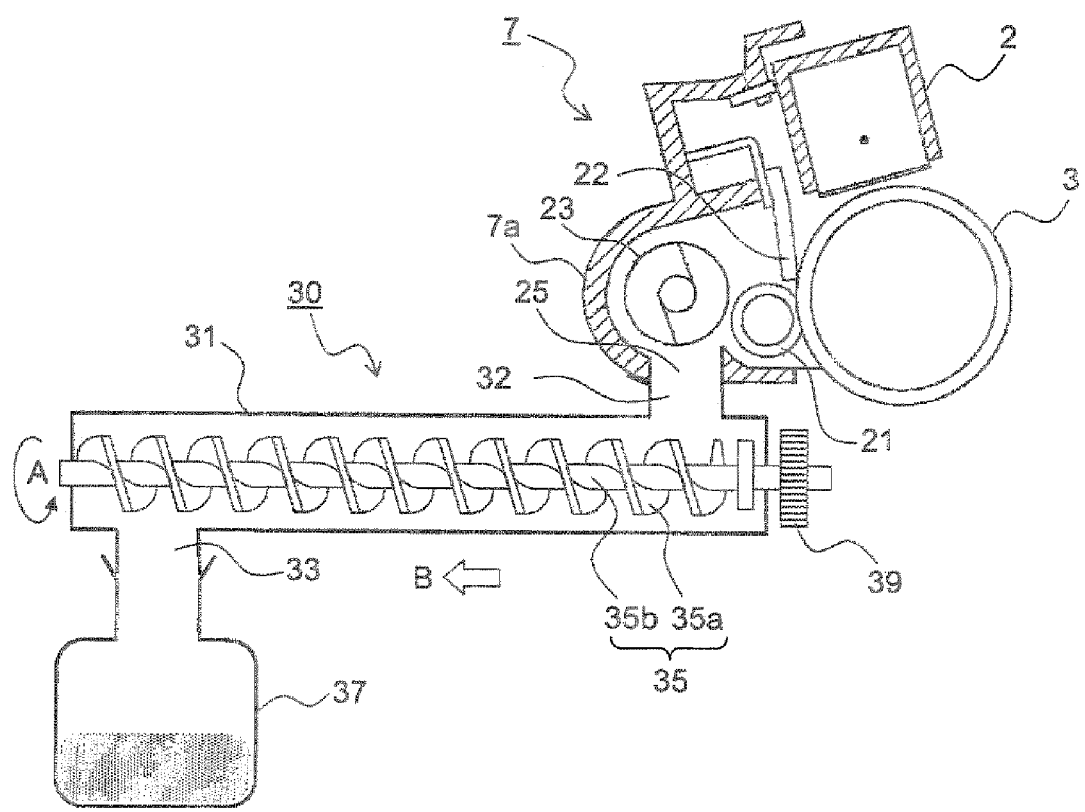
FIG. 2 is a side sectional view showing a configuration in the vicinity of the toner conveying device 30 of the present disclosure and a cleaning device 7 connected thereto.

In the fixing portion 13, a fixing roller pair 12 composed of a heating roller that rotates in the clockwise direction in FIG. 1 and a pressing roller that rotates in a counterclockwise direction in FIG. 1 is housed in a housing. The heating roller includes inside thereof a halogen lamp or the like as a heat source. The sheet onto which the toner image has been transferred by the transfer roller 11 is conveyed into the fixing portion 13 and passes through a fixing nip of the fixing roller pair 12. At this time, the sheet is heated at a predetermined temperature and pressed at a predetermined pressure, so that the toner image on the sheet is fused into a permanent image FIG. 2 is a sectional view of a main part showing a configuration in the vicinity of the cleaning device 7 including a toner conveying device 30 of the present disclosure. In a housing 7a of the cleaning device 7, there are provided a rubbing roller 21 that is in line contact with the photosensitive drum 3 in a longitudinal direction thereof under the action of a spring (not shown), a cleaning blade 22, and a collecting screw 23.

The rubbing roller 21 is in pressure contact with the photosensitive drum 3 under a predetermined pressure and is driven by an unshown driving section so that, at a plane of contact with the photosensitive drum 3, it rotates (forward rotation) to the same direction as a direction to which the photosensitive drum 3 rotates. The rubbing roller 21 is controlled to rotate at a peripheral speed faster (herein, 1.2 times faster) than that of the photosensitive drum 3. The rubbing roller 21 is structured, for example, by forming, around a metal shaft, a foam layer of EPDM rubber having an Asker C hardness of 55° as a roller body. As a material of the roller body, without any limitation to EPDM rubber, any of other types of rubber or foamed rubber bodies may be used, and a material having an Asker C hardness in the range of 10° to 90° is favorably used.

At a position on the surface of the photosensitive drum 3 on a downstream side in the rotation direction with respect to the plane of contact with the rubbing roller 21, the cleaning blade 22 is fixed in a state of being in contact with the photosensitive drum 3. As the cleaning blade 22, for example, a polyurethane rubber blade having a JIS hardness of 78° is used. The cleaning blade 22 is mounted such that, at a point of contact with the photosensitive drum 3, it forms a predetermined angle with respect to a tangential direction of the photosensitive drum 3. Depending on specifications of the photosensitive drum 3, the cleaning blade 22 is set as appropriate in terms of its material, hardness, dimensions, amount of biting into the photosensitive drum 3, force with which it is in pressure contact with the photosensitive drum 3, and so on.

Residual toner scraped off from the surface of the photosensitive drum 3 by the rubbing roller 21 or the cleaning blade 22 falls under gravity and is gradually accumulated in the housing 7a. Rotation of the collecting screw 23 causes the toner in the housing 7a to be sequentially conveyed in a longitudinal direction (direction perpendicular to the plane of FIG. 2) of the housing 7a. The residual toner that has thus been conveyed is drained to the outside of the cleaning device 7 through a toner outlet portion 25 provided at one end of a bottom surface of the housing 7a.

The toner conveying device 30 has a configuration including a toner conveying pipe 31 and a conveying screw 35. A toner inlet port 32 and a toner outlet port 33 are formed at both ends of the toner conveying pipe 31, respectively, and toner inlet port 32 is connected to the toner outlet portion 25 of the cleaning device 7, while the toner outlet port 33 is connected to a waste toner bottle 37. The conveying screw 35 is composed of a conveying vane (spiral vane) 35a and a rotary shaft 35b that penetrates through the center of the conveying vane 35a and is rotatably supported inside the toner conveying pipe 31. The rotary shaft 35b has, at one end thereof, an extended portion extending to the outside of the toner conveying pipe 31, and a drive input gear 39 is provided at a tip end of the extended portion. The drive input gear 39 is connected to a drive motor (not shown) to drive the conveying screw 35 to rotate at a predetermined speed. The conveying screw 35 rotates in an arrow A direction in the figure. This causes toner conveyed from the cleaning device 7 into the toner conveying pipe 31 via the toner inlet port 32 to be sequentially conveyed in an an arrow B direction through the toner conveying pipe 31 to be stored in the waste toner bottle 37 via the toner outlet port 33.

Figure 3:
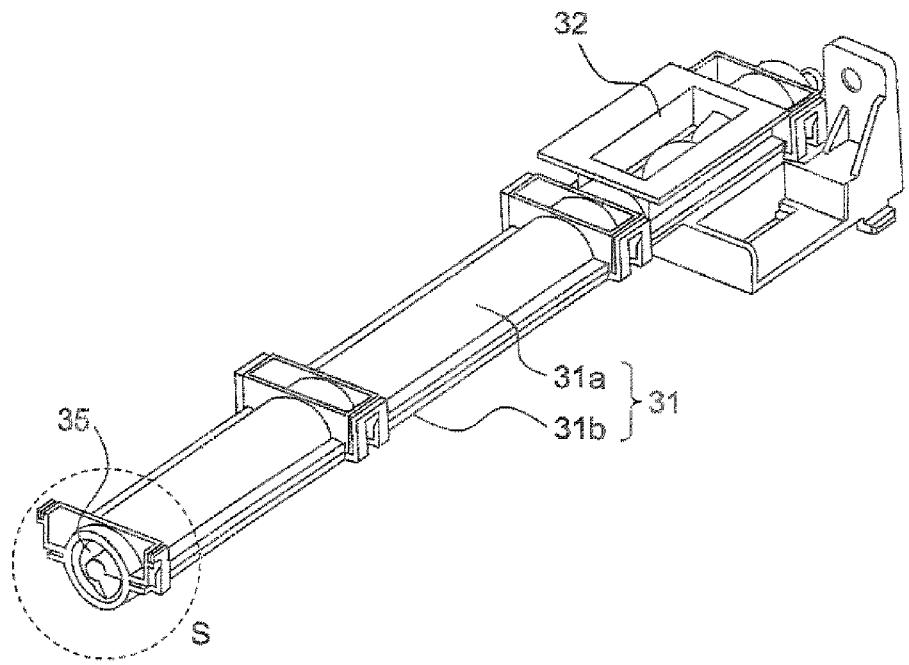
FIG. 3 is a perspective view showing a toner conveying pipe 31 constituting a toner conveying device 30 according to a first embodiment of the present disclosure, in a state where it is cut at a substantially middle portion in a longitudinal direction thereof.
Figure 4:
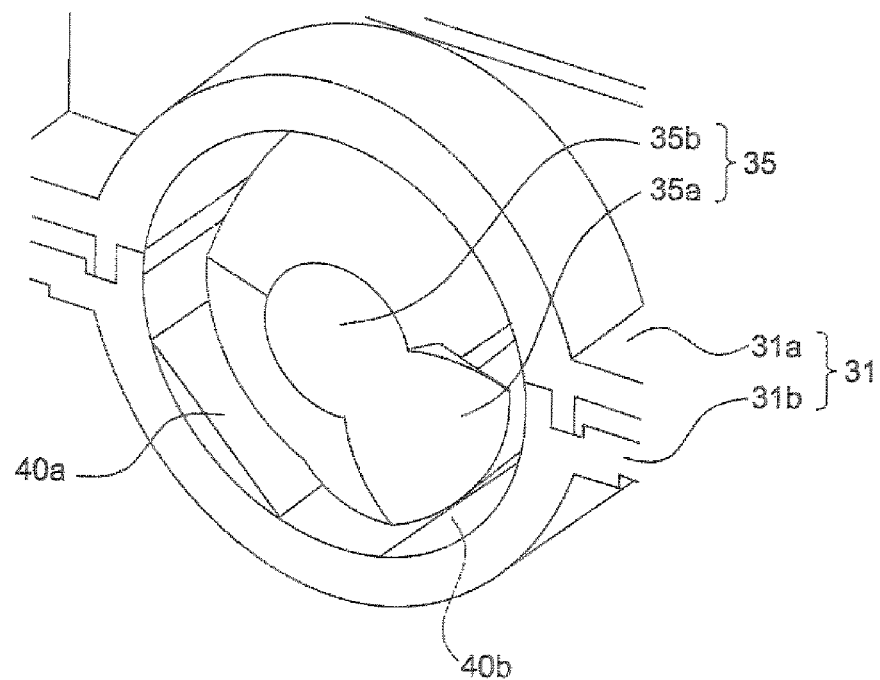
FIG. 4 is an enlarged perspective view of the vicinity of a section of the toner conveying pipe 31 shown in FIG. 3.
Figure 5:
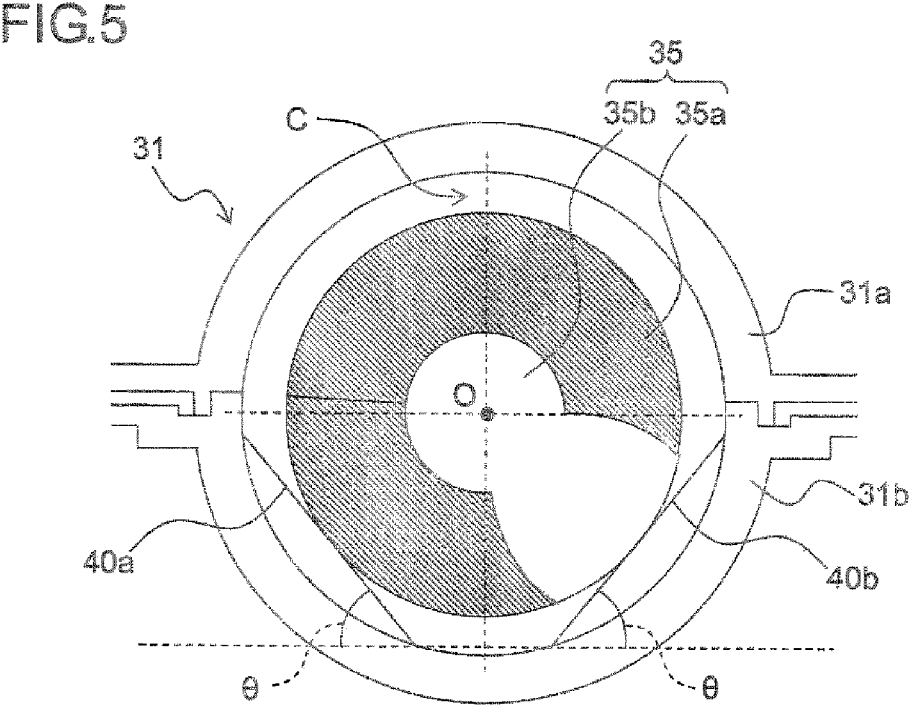
FIG. 5 is a front view of the section of the toner conveying pipe 31 as seen from an axial direction of a conveying screw 35.
Figure 6:
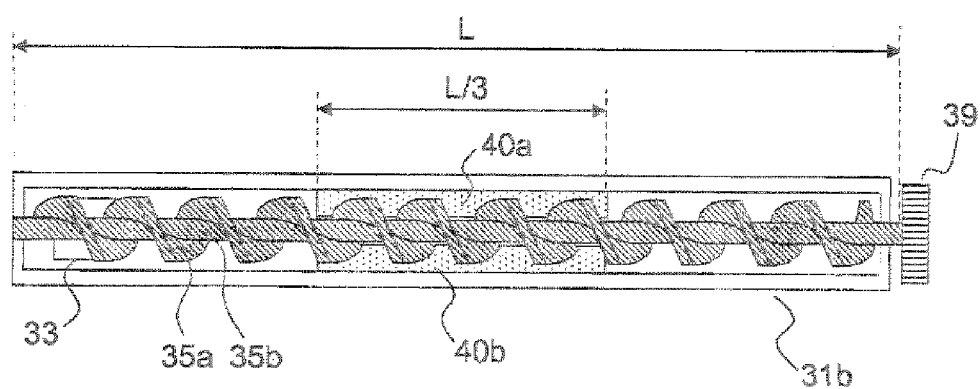
FIG. 6 is a plan view showing the toner conveying pipe 31 in a state where an upper pipe 31a has been demounted therefrom.

FIG. 3 is a perspective view showing the toner conveying pipe 31 constituting the toner conveying device 30 according to the first embodiment of the present disclosure, in a state where it is cut at a substantially middle portion in a longitudinal direction thereof. FIG. 4 is an enlarged perspective view of the vicinity (within a broken line circle S in FIG. 3) of a section of the toner conveying pipe 31. FIG. 5 is a front view of the section of the toner conveying pipe 31 as seen from an axial direction of the conveying screw 35. FIG. 6 is a plan view showing the toner conveying pipe 31 in a state where an upper pipe 31a has been demounted therefrom. The toner conveying pipe 31 is formed in a circular cylindrical shape by combining together the upper pipe 31a and a lower pipe 31b each having a semi-arc-shaped section.

At a substantially middle portion of the lower pipe 31b in a longitudinal direction thereof, inclined faces 40a and 40b are formed integrally with the lower pipe 31b so as to form substantially a V-shape in section. The inclined faces 40a and 40b are formed to be symmetrical with respect to a center axis O of the toner conveying pipe 31, and at a substantially middle portion of the conveying screw 35 in a longitudinal direction thereof, the conveying vane 35a is supported at its outer peripheral edge by the inclined faces 40a and 40b. At this time, an axial center of the rotary shaft 35b of the conveying screw 35 coincides with the center axis O of the toner conveying pipe 31.

With this configuration, the conveying screw 35 rotates in a state of being supported by the inclined faces 40a and 40b so that the rotary shaft 35b is substantially rectilinear. Thus, even if the conveying screw 35 is warped, when rotating, the conveying screw 35 is prevented from being deformed into a wave shape in a radial direction thereof due to an interaction between its warping and sagging under its own weight. This also makes it possible to effectively prevent occurrence of a hitting sound due to the conveying screw 35 impacting against an inner surface of the toner conveying pipe 31.

Furthermore, the conveying screw 35 rotates smoothly without the rotational load being increased, and thus generation of frictional heat attributable to rotation of the conveying screw 35 can be prevented. As a result, it is possible to effectively prevent a decrease in flowability and solidification of toner in the toner conveying pipe 31.

Herein, while the conveying screw 35 is in contact at two obliquely lower portions of the conveying vane 35a with the inclined faces 40a and 40b, on a side opposite to the inclined faces 40a and 40b (above the conveying vane 35a), a predetermined clearance C is secured between the conveying vane 35a and the inner surface of the toner conveying pipe 31 (upper pipe 31a). The clearance C is set to have such a size as to be able to absorb dimensional tolerances and assembly tolerances of the toner conveying pipe 31 and the conveying screw 35. This eliminates the possibilities that the rotational load might be increased due to the conveying vane 35a of the conveying screw 35 coming in contact with the inner surface of the toner conveying pipe 31 and that the conveying screw 35 might get caught between the inclined faces 40a and 40b and the inner surface of the toner conveying pipe 31 to be kept from rotating.

Furthermore, a decrease in angle θ of each of the inclined faces 40a and 40b with respect to a horizontal plane reduces an effect of regulating a displacement of the conveying screw 35 in a horizontal direction (lateral direction in FIG. 5). As a result, if the conveying screw 35 is warped, the conveying screw 35 might swing in the horizontal direction to impact against a side portion on the inner surface of the toner conveying pipe 31. On the other hand, an increase in the angle θ results in the conveying screw 35 becoming stuck between the inclined faces 40a and 40b. As a result, an escape space for the conveying screw 35 is limited to an immediately upward direction thereof, so that the rotational load is increased. For this reason, preferably, the angle θ of each of the inclined faces 40a and 40b with respect to the horizontal plane is set to not less than 40° and not more than 60°.

While in the configuration herein described, the inclined faces 40a and 40b are formed only at the substantially middle portion of the toner conveying pipe 31 in the longitudinal direction thereof, the inclined faces 40a and 40b may be formed to extend over the entire region of the toner conveying pipe 31 in the longitudinal direction thereof. It is to be noted, however, that warping of the conveying screw 35, in most cases, occurs at a middle portion in the longitudinal direction thereof, and, therefore, an effect of supporting the conveying screw 35 cannot be expected so much by forming the inclined faces 40a and 40b in the vicinity of each of both end portions of the toner conveying pipe 31 in the longitudinal direction thereof. Sufficient effect can be expected by, as shown in FIG. 6, forming the inclined faces 40a and 40b so that, at the substantially middle portion of the conveying screw 35 in the longitudinal direction thereof, they are opposed to the conveying screw 35 over a length not more than one third of a total length L (L/3) of the conveying screw 35.

Figure 7:
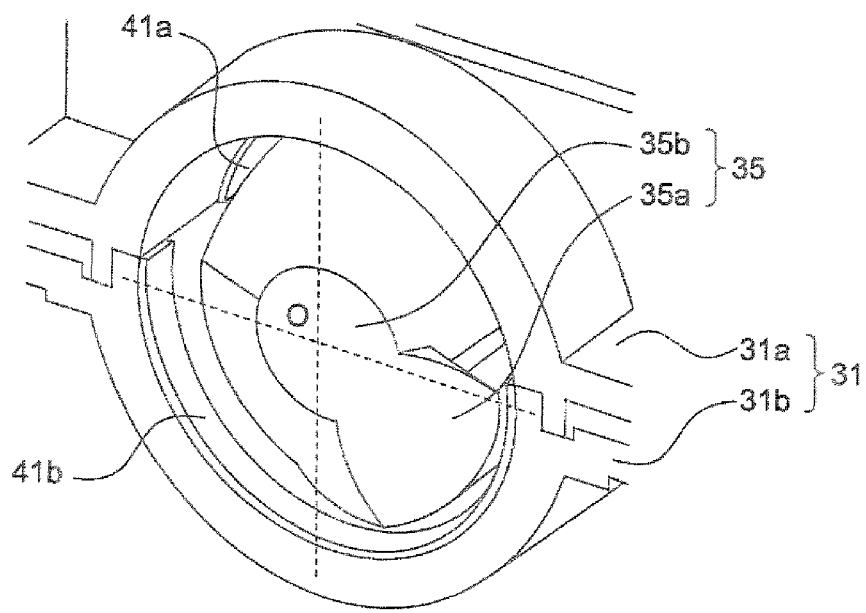
FIG. 7 is an enlarged perspective view of the vicinity of a section of a toner conveying pipe 31 constituting a toner conveying device 30 according to a second embodiment of the present disclosure.
Figure 8:
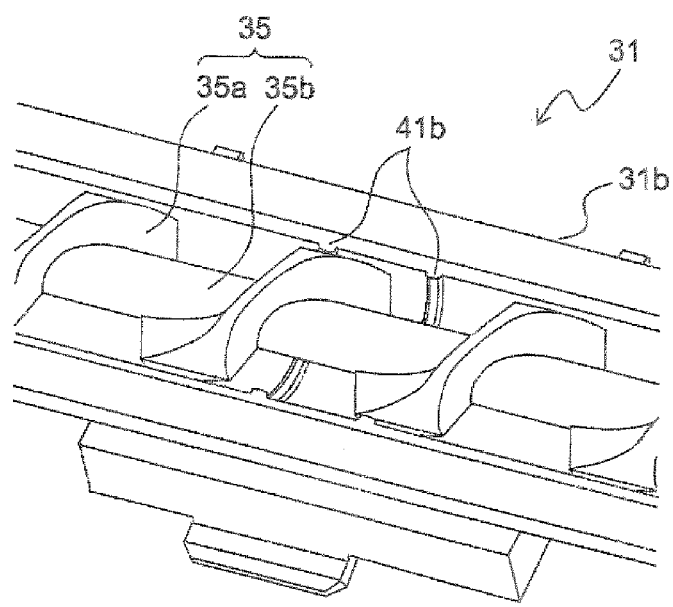
FIG. 8 is a perspective view showing the toner conveying pipe 31 used in the toner conveying device 30 of the second embodiment, in a state where an upper pipe member 31a has been demounted therefrom.
Figure 9:
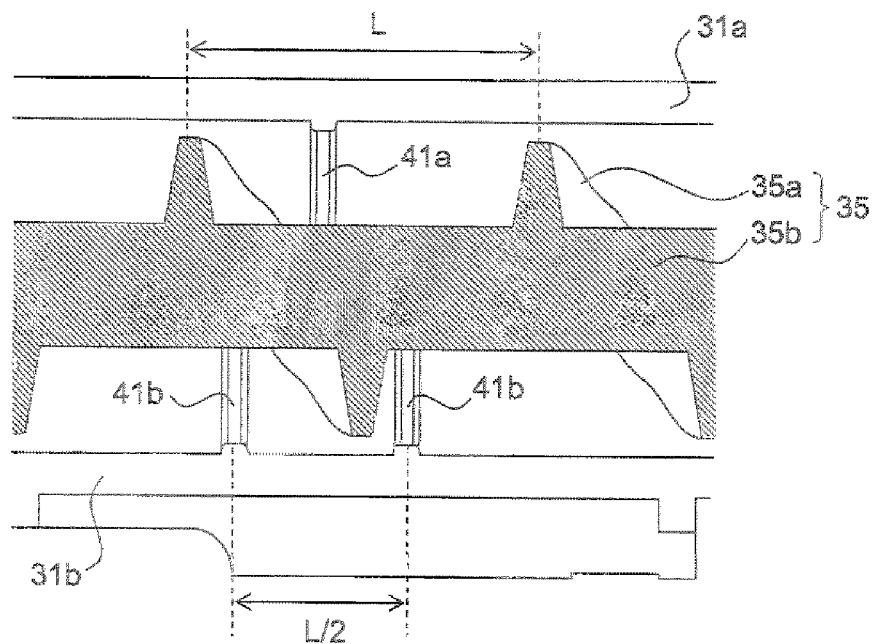
FIG. 9 is a partial sectional view of the toner conveying pipe 31 used in the toner conveying device 30 of the second embodiment, which is obtained by perpendicularly halving the toner conveying pipe 31 along a longitudinal direction thereof.

FIG. 7 is an enlarged perspective view of the vicinity (within the broken line circle S in FIG. 3) of a section of a toner conveying pipe 31 used in a toner conveying device 30 according to a second embodiment of the present disclosure. FIG. 8 is a perspective view showing the toner conveying pipe 31 used in the toner conveying device 30 of the second embodiment, in a state where an upper pipe member 31a has been demounted therefrom. FIG. 9 is a partial sectional view of the toner conveying pipe 31 used in the toner conveying device 30 of the second embodiment, which is obtained by perpendicularly halving the toner conveying pipe 31 along a longitudinal direction thereof. Similarly to the first embodiment, the toner conveying pipe 31 is formed in a circular cylindrical shape by combining together the upper pipe member 31a and a lower pipe member 31b each having a semi-arc-shaped section.

A first rib 41a and second ribs 41b are formed integrally with inner wall surfaces of the upper pipe member 31a and the lower pipe member 31b, respectively. Each of the first rib 41a and the second ribs 41b has a semi-arc-shaped section in a direction orthogonal to an axial direction of the toner conveying pipe 31. Furthermore, when seen from the axial direction of the toner conveying pipe 31, respective inner peripheral surfaces of the first rib 41a and the second ribs 41b are concentric with each other about a center axis O of the toner conveying pipe 31, and a distance from the center axis O to each of the respective inner peripheral surfaces is set to be equal to or somewhat larger than a radius of a conveying vane 35a of a conveying screw 35.

Furthermore, assuming that the conveying vane 35a of the conveying screw 35 has a blade pitch L, two second ribs 41b are formed at a pitch of L/2. Furthermore, one first rib 41a is formed between the second ribs 41b at a position deviated from the positions of the second ribs 41b in the axial direction. At a substantially middle portion of the conveying screw 35 in a longitudinal direction thereof, the conveying vane 35a is supported at its outer peripheral edge by the first rib 41a and the second ribs 41b. At this time, an axial center of a rotary shaft 35b of the conveying screw 35 substantially coincides with the center axis O of the toner conveying pipe 31.

With this configuration, if the conveying screw 35 is warped, even when the conveying screw 35, as it rotates, is shifted in warping direction past an uppermost point to become about to swing in a direction (outwardly in a radial direction) in which sagging thereof under its own weight acts to increase the degree of warping thereof, the conveying vane 35a comes in contact at its outer peripheral edge with the first rib 41a and the second ribs 41b formed on the inner wall surface of the toner conveying pipe 31 in a rotation direction thereof. Thus, the conveying screw 35 is prevented from being deformed into a wave shape in the radial direction thereof due to an interaction between its warping and sagging under its own weight. Hence, the conveying screw 35 rotates in a state of being supported by the first rib 41a and the second ribs 41b so that the rotary shaft 35b is substantially rectilinear. This also makes it possible to effectively prevent occurrence of a hitting sound due to the conveying screw 35 impacting against an inner surface of the toner conveying pipe 31.

Herein, the second ribs 41b are formed at an interval therebetween that is half the blade pitch L (L/2) of the conveying vane 35a. Hence, regardless of how the conveying vane 35a varies in phase as the conveying screw 35 rotates, the conveying vane 35a is always in contact at part of its outer peripheral edge with either of the second ribs 41b. Thus, the conveying screw 35 is reliably supported at its lower portion by the second ribs 41b. The interval between the second ribs 41b is not limited to L/2 and may be, for example, L/3 or 3L/2. That is, as long as the second ribs 41b are formed at an interval therebetween that is other than one blade pitch of the conveying vane 35a, the conveying vane 35a is always in contact at part of its outer peripheral edge with either of the second ribs 41b.

Furthermore, the first rib 41a is formed at a position (that does not coincide with the positions of the second ribs 41b) deviated from the positions of the second ribs 41b in the longitudinal direction (axial direction) of the toner conveying pipe 31. There is, therefore, a gap between the inner wall surface of the toner conveying pipe 31 and the conveying vane 35a, which is continuous in the longitudinal direction of the conveying screw 35. This allows toner conveyed into the toner conveying pipe 31 to move therein through this gap and thus avoids a state where the toner is blocked by the first rib 41a and the second ribs 41b.

Thus, it is also possible to prevent clogging of toner in the toner conveying pipe 31 and a resulting increase in rotary torque of the conveying screw 35. Furthermore, the conveying screw 35 rotates smoothly without the rotational load being increased, and thus generation of frictional heat attributable to rotation of the conveying screw 35 can be prevented. As a result, it is possible to effectively prevent a decrease in flowability and solidification of toner in the toner conveying pipe 31. Moreover, it is also possible to reduce a load imposed on a drive motor that drives the conveying screw 35 to rotate.

While in this embodiment, the first rib 41a and the second ribs 41b are formed only at the substantially middle portion of the toner conveying pipe 31 in the longitudinal direction thereof, the first rib 41a and the second ribs 41b may be formed at a predetermined interval therebetween at a plurality of locations over the entire region of the toner conveying pipe 31 in the longitudinal direction thereof. It is to be noted, however, that warping of the conveying screw 35, in most cases, occurs at a middle portion in the longitudinal direction thereof, and, therefore, an effect of supporting the conveying screw 35 cannot be expected so much by forming the first rib 41a and the second ribs 41b in the vicinity of each of both end portions of the toner conveying pipe 31 in the longitudinal direction thereof. Sufficient effect can be expected by forming the first rib 41a and the second ribs 41b so that, at the substantially middle portion of the conveying screw 35 in the longitudinal direction thereof, they are opposed to the conveying screw 35 over a length not more than one third of a total length of the conveying screw 35.

Figure 10:
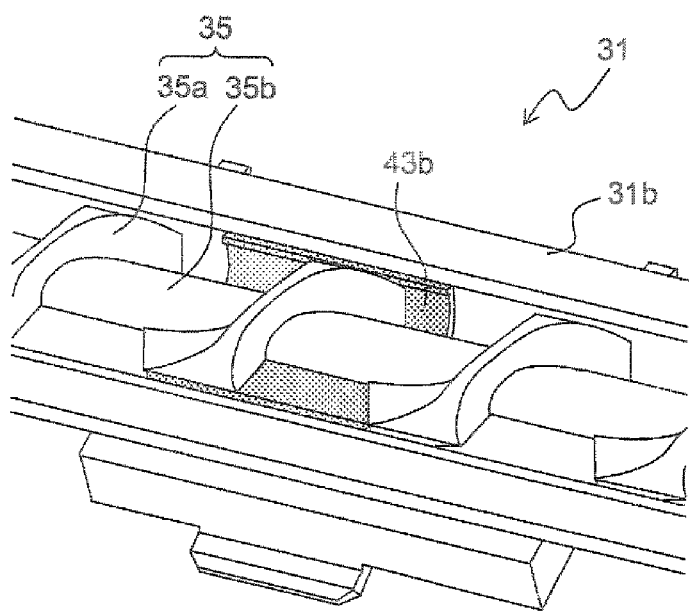
FIG. 10 is a perspective view showing a toner conveying pipe 31 used in a toner conveying device 30 according to a third embodiment of the present disclosure, in a state where an upper pipe member 31a has been demounted therefrom.
Figure 11:
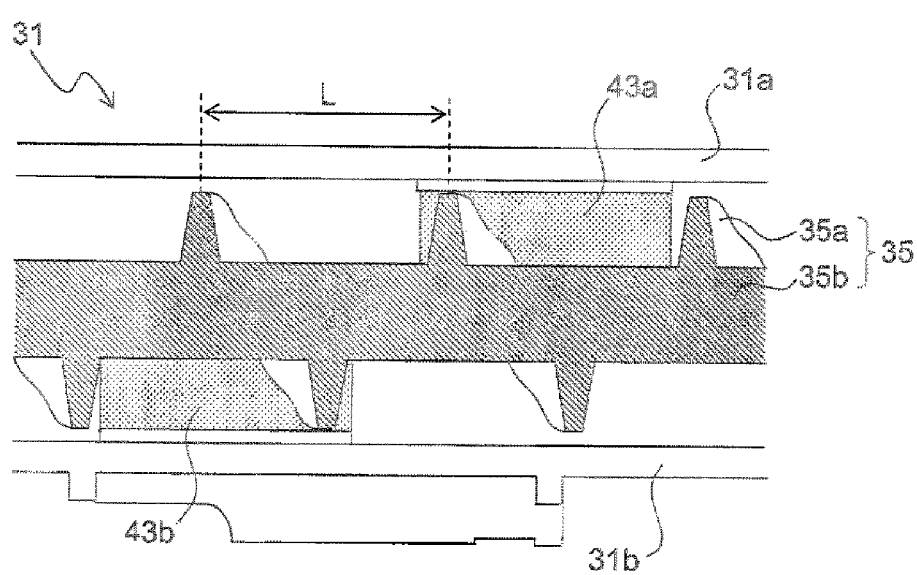
FIG. 11 is a partial sectional view of the toner conveying pipe 31 used in the toner conveying device 30 of the third embodiment, which is obtained by perpendicularly halving the toner conveying pipe 31 along a longitudinal direction thereof.

FIG. 10 is a perspective view showing a toner conveying pipe 31 used in a toner conveying device 30 according to a third embodiment of the present disclosure, in a state where an upper pipe member 31a has been demounted therefrom. FIG. 11 is a partial sectional view of the toner conveying pipe 31 used in the toner conveying device 30 of the third embodiment, which is obtained by perpendicularly halving the toner conveying pipe 31 along a longitudinal direction thereof.

In this embodiment, semi-arc-shaped elastic members (antivibration members) 43a and 43b are attached to inner wall surfaces of the upper pipe member 31a and a lower pipe member 31b, respectively. The elastic members 43a and 43b are made of an elastic material such as, for example, rubber, sponge, or the like. A film material having a low friction coefficient (having a good slipping property) compared with that of the elastic members 43a and 43b is applied onto an inner peripheral surface (surface where contact with a conveying screw 35 is made) of each of the elastic members 43a and 43b. Instead of applying the film material, the inner peripheral surface of each of the elastic members 43a and 43b may be surface-treated with a material having a low friction coefficient. Examples of a material having a low friction coefficient include a fluororesin film, a fluororesin coating agent, and so on.

When seen from an axial direction of the toner conveying pipe 31, the respective inner peripheral surfaces of the elastic members 43a and 43b are concentric with each other about a center axis O of the toner conveying pipe 31, and a distance from the center axis O to each of the respective inner peripheral surfaces is set to be equal to or somewhat larger than a radius of a conveying vane 35a of the conveying screw 35.

Furthermore, assuming that the conveying vane 35a of the conveying screw 35 has a blade pitch L, each of the elastic members 43a and 43b is attached over a length not less than L/2. The elastic member 43a attached to the upper pipe member 31a and the elastic member 43b attached to the lower pipe member 31b are provided at positions that do not coincide with each other in the axial direction. At a substantially middle portion of the conveying screw 35 in a longitudinal direction thereof, the conveying vane 35a is supported at its outer peripheral edge by the elastic members 43a and 43b. At this time, an axial center of a rotary shaft 35b of the conveying screw 35 substantially coincides with the center axis O of the toner conveying pipe 31.

With this configuration, if the conveying screw 35 is warped, even when the conveying screw 35, as it rotates, is shifted in warping direction past an uppermost point to become about to swing in a direction (outwardly in a radial direction) in which sagging thereof under its own weight acts to increase the degree of warping thereof, the conveying vane 35a comes in contact at its outer peripheral edge with the elastic members 43a and 43b attached to the inner wall surface of the toner conveying pipe 31 in a rotation direction thereof. Thus, the conveying screw 35 is prevented from being deformed into a wave shape in the radial direction thereof due to an interaction between its warping and sagging under its own weight. Hence, the conveying screw 35 rotates in a state of being supported by the elastic members 43a and 43b so that the rotary shaft 35b is substantially rectilinear. Furthermore, thanks to the muffling effect of the elastic members 43a and 43b made of an elastic material, it is also possible to effectively prevent occurrence of a hitting sound due to the conveying screw 35 impacting against an inner surface of the toner conveying pipe 31.

Herein, each of the elastic members 43a and 43b is provided over a length not less than half the blade pitch L (L/2) of the conveying vane 35a. Hence, the conveying vane 35a is always in contact at part of its outer peripheral edge with the elastic members 43a and 43b. This makes it possible to effectively reduce a hitting sound that occurs due to the conveying screw 35 impacting against the inner wall surface of the toner conveying pipe 31. Furthermore, the conveying screw 35 is reliably supported at its lower portion by the elastic member 43b.

Furthermore, the elastic member 43a is formed at a position that does not coincide with the position of the elastic ember 43b in the longitudinal direction of the toner conveying pipe 31. There is, therefore, a gap between the inner wall surface of the toner conveying pipe 31 and the conveying vane 35a, which is continuous in the longitudinal direction of the conveying screw 35. This allows toner conveyed into the toner conveying pipe 31 to move therein through this gap and thus avoids a state where the toner is blocked by the elastic members 43a and 43b.

Thus, it is also possible to prevent clogging of toner in the toner conveying pipe 31 and a resulting increase in rotary torque of the conveying screw 35. Furthermore, the conveying screw 35 rotates smoothly without the rotational load being increased, and thus generation of frictional heat attributable to rotation of the conveying screw 35 can be prevented. Hence, it is possible to effectively prevent a decrease in flowability and solidification of toner in the toner conveying pipe 31.

While in this embodiment, the elastic members 43a and 43b are provided only at a substantially middle portion of the toner conveying pipe 31 in the longitudinal direction thereof, the elastic members 43a and 43b may be formed at a plurality of locations in the longitudinal direction of the toner conveying pipe 31. It is to be noted, however, that warping of the conveying screw 35, in most cases, occurs at a middle portion in the longitudinal direction thereof, and, therefore, an effect of supporting the conveying screw 35 cannot be expected so much by forming the elastic members 43a and 43b in the vicinity of each of both end portions of the toner conveying pipe 31 in the longitudinal direction thereof. Sufficient effect can be expected by forming the elastic members 43a and 43b so that, at the substantially middle portion of the conveying screw 35 in the longitudinal direction thereof, they are opposed to the conveying screw 35 over a length not more than one third of a total length of the conveying screw 35.

The present disclosure is not limited to the foregoing embodiments and may be variously embodied within the spirit of the present disclosure. While each of the foregoing embodiments describes the cleaning device 7 including the rubbing roller 21 and the cleaning blade 22, the toner conveying device 30 of the present disclosure is applicable to cleaning devices of various configurations such as, for example, a configuration in which the cleaning device 7 includes only the cleaning blade 22, a configuration in which the cleaning device 7 includes a fur brush in place of the cleaning blade 22, and so on.

Furthermore, while in the foregoing first embodiment, the inclined faces 40a and 40b are formed integrally with the lower pipe 31b, the inclined faces 40a and 40b may be formed as members separate from the lower pipe 31b and fixed to the lower pipe 31b. Moreover, the inclined faces 40a and 40b may be, instead of being flat faces, formed to be somewhat concave or convex. Furthermore, while each of the foregoing embodiments uses the conveying screw 35 formed by providing the continuous spiral-shaped conveying vane 35a around the rotary shaft 35b, the shape of the conveying vane 35a is not limited to the spiral shape. For example, as the conveying screw 35, a conveying screw may be used that is formed by providing, as the conveying vane 35a, a plurality of halfmoon-shaped plate bodies (bodies obtained by halving circular plates) at a predetermined inclination angle in an alternate arrangement around the rotary shaft 35b.

Furthermore, each of the foregoing embodiments describes an example in which the toner conveying device 30 of the present disclosure is disposed in the waste toner collecting path from the cleaning device 7 to the waste toner bottle 37. In addition thereto, the present disclosure is applicable in exactly the same manner also to, for example, a case where the toner conveying device 30 is disposed in a toner conveying path from the toner container 6 to the developing unit 5.

The present disclosure is usable for a toner conveying device having a toner conveying pipe and a conveying screw disposed inside the toner conveying pipe. By use of the present disclosure, it is possible to prevent occurrence of a hitting sound due to the conveying screw impacting against an inner surface of the toner conveying pipe and to effectively prevent a decrease in flowability and solidification of toner due to an increase in rotational load of the conveying screw.

What is claimed is:

1. A toner conveying device, comprising:
   a conveying screw that has a rotary shaft and a conveying vane formed on an outer peripheral surface of the rotary shaft;
   a toner conveying pipe that has a circular section and inside which the conveying screw is rotatably disposed; and
   a plurality of convex portions that are formed on an inner wall surface of the toner conveying pipe, and each of which is formed within an area defined by half a circumference along the inner wall surface of the toner conveying pipe and supports the conveying screw so that an axial center of the rotary shaft substantially coincides with a center axis of the toner conveying pipe,
   wherein the convex portions are inclined faces that are formed at a lower portion of the inner wall surface of the toner conveying pipe so as to support an outer peripheral edge of the conveying vane and, as seen from a direction of the center axis of the toner conveying pipe, the inclined faces form substantially a V-shape symmetrical with respect to the center axis.

2. The toner conveying device according to claim 1, wherein
   each of the inclined faces forms an angle of not less than 40° and not more than 60° with respect to a horizontal plane.

3. The toner conveying device according to claim 1, wherein
   the toner conveying pipe is formed by combining together an upper pipe constituting an upper half of an outer peripheral surface of the toner conveying pipe as seen from an axial direction thereof and a lower pipe constituting a lower half of the outer peripheral surface, and
   the inclined faces are formed integrally with an inner wall surface of the lower pipe.

4. The toner conveying device according to claim 1, wherein
   the convex portions are formed so that, at a substantially middle portion of the conveying screw in a longitudinal direction thereof, they are opposed to the conveying screw over a length not more than one third of a total length of the conveying screw.

5. An image forming apparatus comprising the toner conveying device according to claim 1.

* * * * *